W. D. McNAULL.
VEHICLE TIRE.
APPLICATION FILED MAR. 23, 1908.

914,599.

Patented Mar. 9, 1909.
2 SHEETS—SHEET 1.

W. D. McNAULL.
VEHICLE TIRE.
APPLICATION FILED MAR. 23, 1908.

914,599.

Patented Mar. 9, 1909.
2 SHEETS—SHEET 2.

WITNESSES
Ada E. Cameron
Chin V. Wagner

INVENTOR:
William D. McNaull
By Amos Hall His Atty.

UNITED STATES PATENT OFFICE.

WILLIAM D. McNAULL, OF TOLEDO, OHIO.

VEHICLE-TIRE.

No. 914,599.

Specification of Letters Patent.

Patented March 9, 1909.

Application filed March 23, 1908. Serial No. 422,622.

*To all whom it may concern:*

Be it known that I, WILLIAM D. Mc-NAULL, a citizen of the United States, residing at Toledo, in the county of Lucas and State of Ohio, have invented certain new and useful Improvements in Vehicle-Tires; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to tires for vehicles, and its object is to furnish a tire which shall have the resiliency of pneumatic tires without their familiar disadvantages due to their first cost, the trouble and annoyance of inflating the same, their short life and liability to punctures, and other accidents. I attain this object by means of the construction and arrangement of parts hereinafter described and shown, and illustrated in the accompanying drawings, in which,—

Figure 1:
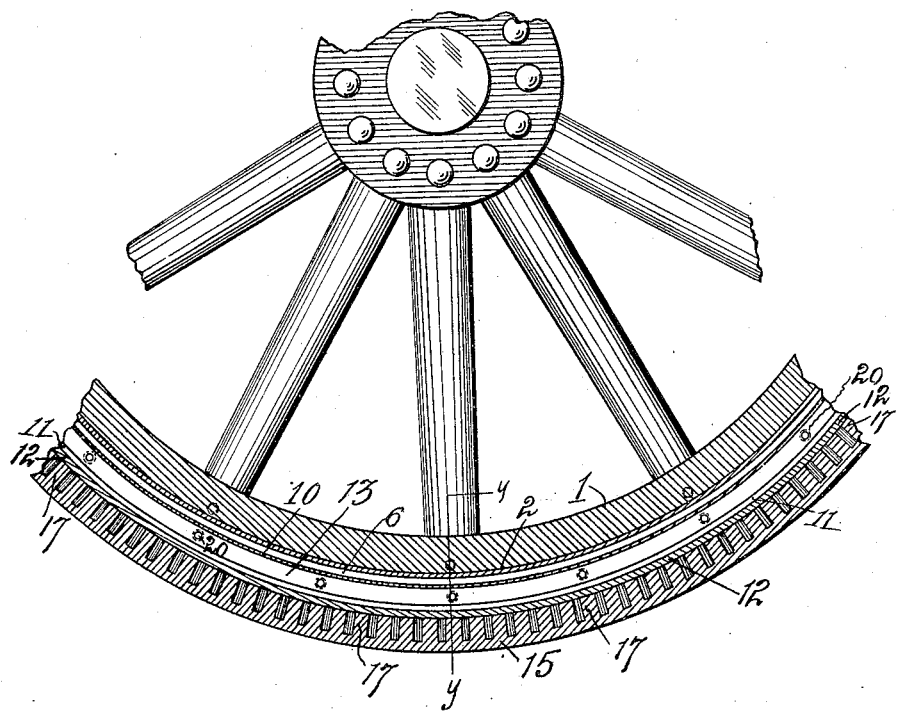
Figure 2:
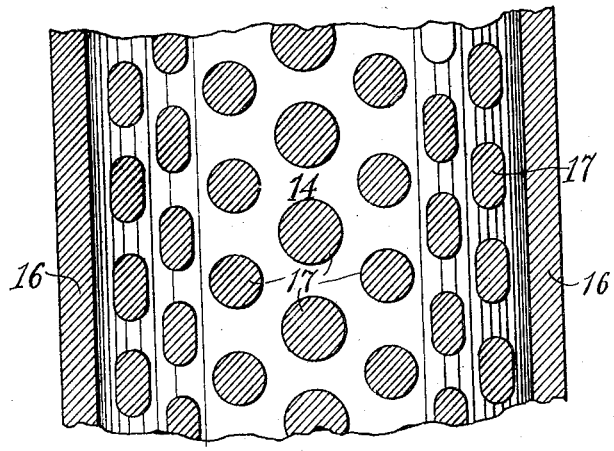
Figure 3:
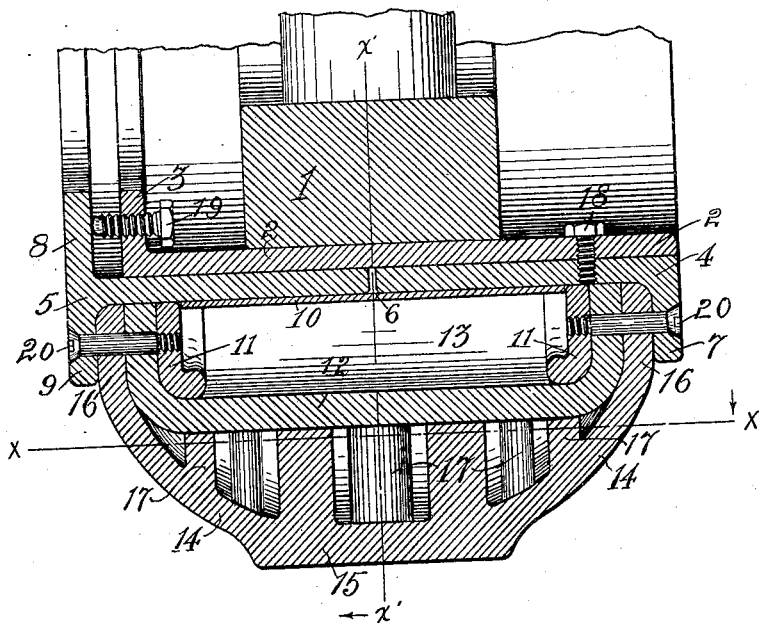

Figure 1 is a side-elevation of part of a wheel provided with my device shown in section taken on line $x'—x'$, Fig. 3; Fig. 2, a sectional plan-view of a part of the outer member of my tire taken on line $x—x$, Fig. 3, and extended in a flat plane, and Fig. 3, a transverse sectional elevation of my device taken on line $y—y$, Fig. 1.

Like numerals of reference indicate like parts throughout the drawings.

In the drawings, 1 is the felly of a wheel. Upon the periphery of the felly is secured a metal rim 2, one margin of which is turned to form an inwardly projecting flange, as at 3.

4—5 is a circumferentially divided band, separated by an annular space 6 and fitted upon the periphery of the rim 2, the part 4 having at its outer margin an outwardly turned flange 7, the part 5 having at its outer margin an inwardly projecting flange 8 and an outwardly projecting flange 9. A metal band 10 embraces the parts 4—5 which are adjustable toward and away from each other between the rim 2 and the band 10 as hereinafter explained.

11—11 are rings which embrace the parts 4—5, the outer margin of these rings being turned or rounded as shown to form smooth bearing surfaces.

12 is a band or belt of india-rubber, of such circumference as to fit snugly the outer edges of the rings 11 and broad enough to form flanges which considerably overlap said rings. It will be seen that between the two rings 11—11 and the inner side of the band 12 and the outer side of the band 10 is an annular circumferential space or channel 13 of a depth corresponding with the width of the rings and allowing a considerable inward deflection of the band 12. Surrounding the band 12 is another band 14, of rubber or other suitable flexible elastic material, arched transversely and having a peripheral bearing-portion 15 and marginal flanges 16. Projecting inwardly from the transversely and circumferentially arched member 14 are flexible elastic protuberances or fingers 17, arranged close together, as illustrated in Fig. 2, and designed to furnish series of elastic cushions interposed between the elastic member 12 and the outer tire 14. The parts 17 are of varying lengths, as illustrated in Fig. 3, to accommodate them to the inner transverse curve of the outer tire 14, and they are also of varied transverse areas, as illustrated, proportioned to the radial pressures and transverse strains to which they are likely to be exposed. The marginal flanges of the parts 12—14 are turned inwardly and are disposed side by side and are clamped in position by means of clamping screws 20 passing through the flanges 7—9, through the flanges of the parts 12—14, and engaging at their inner ends the rings 11. On tightening up the screws 20 it will be seen that the margins of the parts 12—14 are securely clamped between the flanges 7—9 and the rings 11 and in operative relation to the periphery of the wheel.

The part 4 is rigidly secured to the rim 2 by means of screws 18. Passing through the flange 3 and abutting against the flange 8 of the part 5 is a series of adjusting screws 19. Upon setting up the screws 19 the part 5 is forced horizontally outwardly carrying with it the clamping screws 20 and the ring 11 and the flexible flanges connected therewith, thus regulating and controlling the transverse tension of the parts 12 and 14 the opposite margins of which are held stationary by their connection with the part 4. It will be seen that by removing the screws 18 the parts 4—5 and the parts connected with or secured thereto may be slipped bodily sidewise off from the wheel to facilitate renewals, repairs, adjustments, or the like.

While I have shown a convenient and desirable means for securing the two elastic members 12—14 in operative relation to the wheel, it should be understood that I do not limit my invention to the devices designed for such purpose as here described, for, obviously, other methods of securing these members in place will readily suggest themselves to those skilled in the art. Although I have shown the tentacular members 17 as formed integral with the outer tire 14 it will be clear that notwithstanding this is the preferred form of construction, other means may be employed for retaining these members in proper relation to each other and to the outer tire and to the inner flexible transverse bridge 12.

The parts being assembled as above described, it will be seen that the weight of the wheel and its vehicle will rest upon the bearing portion 15 and that, while the margins of the parts 12—14 are securely held against movement, the flexible outer tire and the interposed elastic cushions or fingers coacting with the transversely tensioned belt, together form an extremely elastic tire well adapted to take up jar and vibration and to serve substantially the same purpose as the cushions formed by a pneumatic tire.

Having described my invention, what I claim and desire to secure by Letters Patent is,—

1. In a vehicle tire, an elastic belt supported at its margins and tensioned transversely, an outer circumferential tire-member, and radially disposed elastic fingers forming cushions interposed between the belt and the outer tire-member.

2. In a vehicle tire, a circumferential elastic belt, circumferential supports for the margins of the belt,—said supports having an annular channel therebetween,—means for securing the margins of the belt at opposite sides of the channel, an outer transversely arched tire-member, and elastic fingers interposed as cushions between the outer member and the belt.

3. In a vehicle tire, a circumferential elastic belt, circumferential supports for the margins of the belt,—said supports having an annular channel therebetween,—an outer tire-member, elastic fingers interposed as cushions between the outer tire-member and the belt, means for securing the margins of the belt and of the outer member at opposite sides of said channel, and means for the lateral adjustment of the tension of the belt.

4. In a vehicle tire, a circumferential belt, cushions between the belt and the outer tire-member, and elastic fingers disposed as cushions between the belt and the outer tire-member, said fingers being of varying lengths to conform to said arch.

5. In a vehicle tire, a circumferential belt, a flexible transversely arched outer tire-member, and elastic fingers disposed as cushions between the two, said fingers being of varying lengths to conform to the arch and of decreasing cross-sectional area toward the sides of the tire.

6. In a device of the described character, an elastic belt, an outer circumferential tire-member, elastic fingers forming cushions interposed between the belt and the outer member, a flanged band, rings coincident with the flanges of said band, marginal flanges upon the elastic belt and upon the outer tire-member, and means for clamping said flanges of the belt and the outer tire-member between the rings and the flanges of the band.

7. In a device of the described character, an elastic belt, an outer circumferential tire-member, elastic fingers forming cushions interposed between the belt and said tire-member, a circumferentially divided flanged band, rings coincident with the flanges of said band, marginal flanges upon the elastic belt and the outer tire-member, which flanges are secured between the flanges of said band and said rings, and means for adjusting and securing the parts of the divided band in separated relation.

In testimony whereof I affix my signature in presence of two witnesses.

WILLIAM D. McNAULL.

Witnesses:
CLAYTON MURPHY,
ADA E. CAMERON.